Feb. 28, 1950 W. J. RADY 2,498,824
BATTERY CHARGING SYSTEM
Filed July 18, 1945
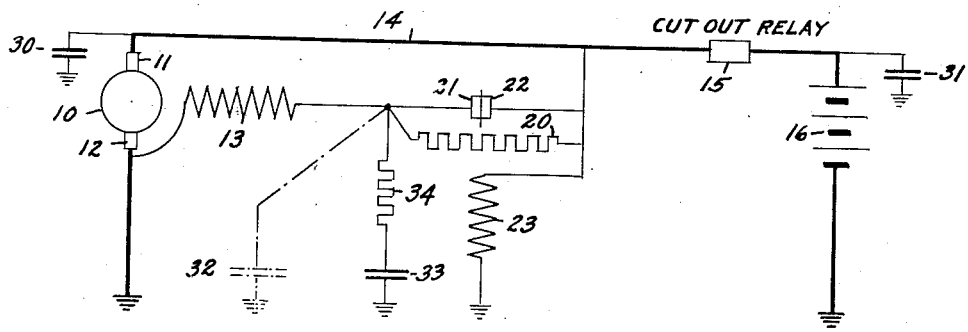
INVENTOR
William J. Rady
BY
Spencer, Hardman & Fehr
his ATTORNEYS Patented Feb. 28, 1950

2,498,824

UNITED STATES PATENT OFFICE 2,498,824

BATTERY CHARGING SYSTEM

William J. Rady, Anderson, Ind., assignor to General Motors Corporation, Detroit, Mich., a corporation of Delaware Application July 18, 1945, Serial No. 605,672

3 Claims. (Cl. 320—69)

This invention relates to a battery charging system comprising a storage battery, a battery charging generator and a generator voltage regulator.

It is an object of the present invention to provide for the suppression of transient currents created by the voltage regulator of the battery charging apparatus thereby preventing interference with the operation of radio apparatus in the vicinity of the system, while at the same time avoiding rapid transfer of contact material between the contacts of the voltage regulator.

Further objects and advantages of the present invention will be apparent from the following description, reference being had to the accompanying drawing, wherein a preferred embodiment of the present invention is clearly shown.

The drawing is a wiring diagram showing an embodiment of the present invention.

Referring to the drawing, a generator 10 having brushes 11 and 12 and field winding 13 is connected by wire 14 and cutout relay 15 with a storage battery 16. The voltage regulator, in its simplest form, comprises a field regulating resistance 20, a resistance by-pass including normally closed contacts 21 and 22 and an electromagnet 23 which responds to a predetermined generator voltage for causing separation of the contacts 21 and 22 to interrupt the by-pass of the resistance 20 whereby the field current is reduced. Heretofore it has been the practice when using such a battery charging system in the vicinity of radio apparatus, as for example, on an airplane, to connect different parts of the system with ground through radio interference suppression condensers such as condenser 30 connected with the terminal of the generator with which the non-grounded brush 11 is connected, such as condenser 31 connected between the cutout relay and the battery and a condenser 32 connected directly with the field coil 13 as indicated in dot-dash lines.

It had been found that such a circuit does not entirely suppress radio interference and also gives rise to a rapid transfer of contact material between the contacts 21 and 22. I have discovered that the difficulty is due to the following: When the contacts 21 and 22 begin to separate, that is, when they have separated an infinitesimal amount, the voltage across the contacts rises rapidly due to the voltage induced in the field coil 13 by reason of the sudden reduction of field current. During the increase of the induced voltage, the condenser 32 is being charged. Finally, the voltage reaches a value such as to ionize the gap between the contacts 21 and 22 so that a spark will form thereby providing a discharge path of low resistance. Then the condenser 32 discharges across this path and through the battery. The instantaneous value of the current discharged from the condenser 32 is high and causes rapid transfer of material from one contact to the other. This high peak current has an effect on adjacent radio apparatus by starting other circuits to vibrating at their own frequencies. I have remedied this difficulty by placing between the generator field coil terminal and a suppression condenser 33 shown in full lines, a resistance 34 of such value as to materially reduce the condenser discharge current while at the same time permitting the condenser 33 to perform its function of suppressing radio interference. For example, in a battery charging system using a generator rated at 24 volts and 50 amps and having a field coil through which 1.3 amps current flows until the regulator contacts are separated, I have found that satisfactory results are obtained with a four ohm resistance 34 in series with a .0015 microfarad condenser 33.

While the embodiment of the present invention as herein disclosed constitutes a preferred form, it is to be understood that other forms might be adopted, all coming within the scope of the claims which follow.

What is claimed is as follows:

1. A battery charging system comprising a storage battery, a battery charging generator having a field coil, a voltage regulator comprising contacts in a charging circuit connecting a terminal of the field coil with the generator and battery, a resistance in parallel with the contacts, an electromagnet connected with the generator for separating the contacts when a predetermined voltage is obtained, the charging circuit then being completed through said resistance in parallel and means for attenuating transient currents affecting operation of radio apparatus, and including a condenser having one terminal connected to the charging line opposite in polarity to that which the regulator contacts are connected and a resistance connecting the other terminal of said condenser to the terminal of the field coil, said resistance being of such value as to materially reduce the discharge current of said condenser when the contacts separate thereby reducing the transfer of contact material between the contacts and thereby preventing appreciable interference with radio apparatus by reason of the discharge of said condenser.

2. A battery charging system comprising a storage battery, a battery charging generator having a field coil, a voltage regulator comprising contacts in a charging circuit connecting a terminal of the field coil with the generator and battery, a resistance in parallel with the contacts for completing the charging circuit when the contacts are open, an electromagnet connected with the generator for separating the contacts when a predetermined voltage is obtained, and means for attenuating transient currents affecting operation of radio apparatus, and including a condenser having one terminal connected to the charging line opposite in polarity to that which the regulator contacts are connected and a resistance in series relation with the other terminal of said condenser and connected with the field coil of the generator, said resistance being of such value as to materially reduce the discharge current of said condenser when the contacts separate thereby reducing the transfer of contact material between the contacts and thereby preventing appreciable interference with radio apparatus by reason of the discharge of said condenser.

3. In combination, a storage battery; a generator having a field coil for charging the battery; a voltage regulator including contacts in a charging circuit for connecting a terminal of the field coil with the generator and the battery; a resistance connected across the contacts and adapted to be shunted thereby, said resistance completing the charging circuit when the contacts are open; a condenser connected to said circuit, said condenser having one terminal grounded and having the other terminal connected to the terminal of the field coil; and a second resistance for reducing the discharge current of the condenser when the contacts separate and thereby reduce transfer of contact material between the contacts, said second resistance being connected in series relation with the last two mentioned terminals.

WILLIAM J. RADY.

REFERENCES CITED

The following references are of record in the file of this patent:

UNITED STATES PATENTS

| Number | Name | Date |
|---|---|---|
| 1,953,961 | Hyland | Apr. 10, 1934 |
| 1,959,114 | Sjoholm et al. | May 15, 1934 |